H. B. BROWN.
DAMPING DEVICE FOR ELECTRICAL INSTRUMENTS.
APPLICATION FILED NOV. 16, 1921.
1,429,840. Patented Sept. 19, 1922.
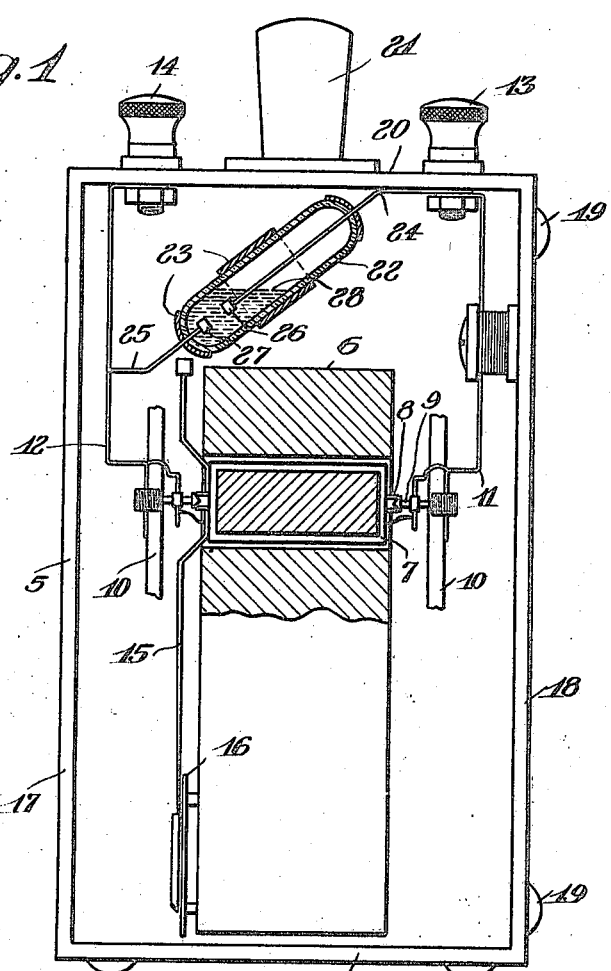
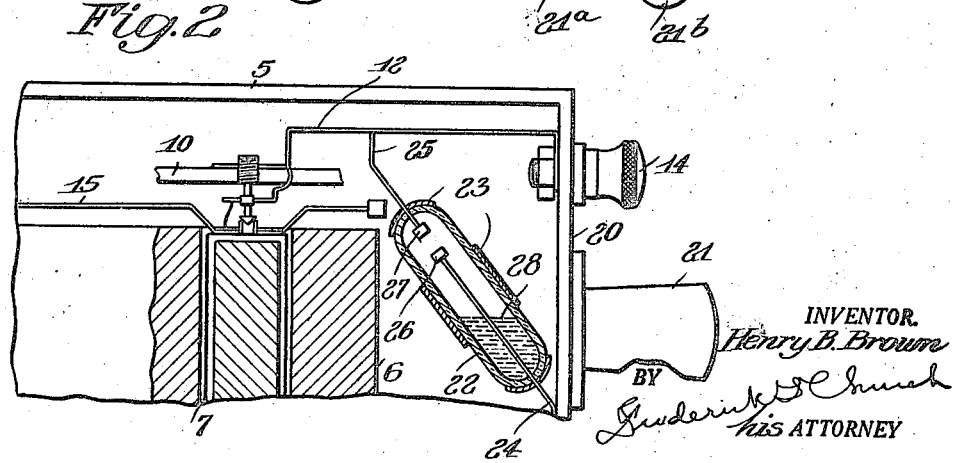
INVENTOR.
Henry B. Brown
BY
his ATTORNEY Patented Sept. 19, 1922.

1,429,840

UNITED STATES PATENT OFFICE.

HENRY B. BROWN, OF ROCHESTER, NEW YORK, ASSIGNOR TO TAYLOR INSTRUMENT COMPANIES, OF ROCHESTER, NEW YORK, A CORPORATION OF NEW YORK.

DAMPING DEVICE FOR ELECTRICAL INSTRUMENTS.

Application filed November 16, 1921. Serial No. 515,735.

*To all whom it may concern:*

Be it known that I, HENRY B. BROWN, of Rochester, in the county of Monroe and State of New York, have invented certain new and useful Improvements in Damping Devices for Electrical Instruments; and I do hereby declare the following to be a full, clear, and exact description of the same, reference being had to the accompanying drawings, forming a part of this specification, and to the reference numerals marked thereon.

This invention relates to damping devices for portable electrical instruments such, for example, as ammeters and volt-meters, in which relatively movable inductive means are employed for actuating an indicating pointer or other movable part. Actuating means of this nature are of a comparatively delicate construction liable to injury by the shocks and vibrations incident to transportation of the instrument from place to place. Such instruments are commonly arranged to occupy one position, as, for example, to rest upon one side, while in operation and to occupy a different position with another side lowermost while being transported. It is one object of the present invention to utilize the latter feature of such instruments for providing a simple and effective damping device operated automatically upon movement of the instrument into position for transportation, for restraining movement of the actuating parts, without however in any way interfering with the operation of the parts while the instrument is in use.

Another object is to provide instruments of this class employing an actuating coil movable in a magnetic field with an advantageous type of switch arranged to bridge the terminals of the coil and to be automatically closed whenever the instrument is moved to position for transportation for short circuiting the coil and thus restraining its movements. To these and other ends the invention resides in certain improvements and combinations of parts all as will hereinafter be more fully described, the novel features being pointed out in the claims at the end of the specification.

In the drawings:

Figure 1 is a central sectional elevation of an instrument having the present invention applied thereto, the instrument being shown in position for transportation; and Figure 2 is a similar view, with parts broken away, but showing the instrument in operating position.

Similar reference numerals throughout the several views indicate the same parts.

The embodiment of the invention selected for the purposes of the present disclosure to illustrate the principles involved and a preferred practical application of the same, shows the invention as employed in conjunction with an electrical meter of the galvanometer type, enclosed within a casing 5. At 6 is indicated magnet means providing a magnetic field in which a coil 7 is supported for oscillating movement. The latter is illustrated in the present instance as having bearings 8 at its ends rotatably supported on trunnions 9 carried in any suitable manner by supporting means fixed to the casing and indicated at 10.

Electrical connection is made with the coil through its trunnion supporting means as indicated at 11 and 12, these connections being carried to the top 20 of the casing and provided with binding posts 13 and 14 respectively for inclusion in a circuit with which the instrument is to be used. One end of the coil has fixed thereto an indicating part, or needle 15, the end of which plays over a fixed dial or scale 16. The adjacent side or front, 17, of the casing is, of course, formed with a window through which the movements of the needle are visible, and the instrument is thus arranged to occupy a position while in operation with the side 17 uppermost, or, in other words, supported on the opposite side or back 18 which is provided with buffers 19. The top 20 of the casing to which the binding posts are attached carries a handle 21 for transporting the instrument from place to place so that during transportation the instrument thus occupies a position different from that occupied during its use. The bottom 21$^a$ of the casing is adapted by means of buffers 21$^b$ for supporting the instrument when not in use. The above construction is one commonly found and well known in the art, so that more detailed description thereof is unnecessary, and it is in conjunction with an instrument of this general class that the present embodiment of the invention is employed.

The present improvement is preferably in the form of a switch located in the casing and bridging the terminals of the coil 7 so as to short circuit the latter when the switch is closed, thereby completing a circuit for a counter electro-motive force induced by vibrations of the coil in its field incident to movements of the instrument during transportation, for damping and restraining such movement of the coil to obviate the injury of the same. This switch comprises, preferably, an elongated container 22 of capsular shape, so arranged or inclined as to bring one of its ends lowermost while the instrument is in position for transportation, and the opposite end lowermost when the instrument occupies the position of use, as illustrated in Figures 1 and 2. Extending through the ends of the container are conductors 24 and 25, connected with the respective conductors 11 and 12 of the coil and terminating within the container in spaced contacts 26 and 27 located in the end of the container which is brought lowermost by the movement of the instrument to transporting position. The container is partially filled with a conducting fluid 28, such, for example, as mercury. When the instrument is in position for transportation, as shown in Figure 1, the fluid 28, flowing into the lower end of the tube in which contacts 26 and 27 are located, electrically connects the latter, thus completing a circuit of low resistance through the actuating coil 7. When the instrument is in operating position, on the other hand, as shown in Figure 2, the conducting fluid flows into the opposite end of the container so that the contacts 26 and 27 are left separated by an air gap. The short circuiting path through the coil is thus broken, leaving the instrument for operation in the usual manner without any interference with its actuating parts.

The operation of the device has been explained in connection with the above description of its construction. While the instrument is in use and rests upon its back 18, in the position shown in Figure 2, the conducting fluid is in the end of the container opposite the short circuiting switch contacts so that the operation of the instrument is not affected. When the instrument is disposed for transportation however and rests on its end 21ª, or is carried by means of the handle 21, the mercury occupies the opposite end of the container, automatically connecting the contacts and short circuiting or damping the actuating coil. The tendency of the latter to move as a result of the impacts or vibrations incident to movement of the instrument from place to place is thus effectively restrained independently of the attention of the operator or the making of any special adjustments to that end. The damping device is thus exceedingly simple in construction and inexpensive and occupies but little space so that it may be readily included in instrument cases of the usual size. Its operation is reliable and automatic and the instrument is thus safeguarded whenever placed in transporting position.

I claim as my invention:

1. The combination with a portable electric instrument having actuating means comprising a relatively movable magnetic field and coil, said instrument being adapted for arrangement in one position during operation and in a different position during transportation, of a switch operated automatically by movement of the instrument from operating position to transporting position for shortcircuiting said coil and damping the movement of said actuating means during transportation of the instrument.

2. The combination with a portable electric instrument having actuating means comprising a relatively movable magnetic field and coil, said instrument being adapted for arrangement in one position during operation and in a different position during transportation, of a switch comprising spaced contacts and a fluid conductor for automatically connecting the same upon movement of the instrument from operating to transporting position for shortcircuiting said coil and damping the movement of said actuating means during transportation of the instrument.

3. The combination with a portable electric meter having a magnetic field and an actuating coil movably supported therein, said meter being adapted for arrangement in one position during operation and a different position during transportation, of a switch bridging the terminals of said coil and comprising means movable automatically to close the switch upon movement of the meter from operating position to transporting position for shortcircuiting the coil and damping the movement thereof during transportation of the meter.

4. The combination with a portable electric instrument comprising indicating means and a coil movable in a magnetic field for actuating said indicating means, said instrument being arranged to occupy one position during operation and a different position during transportation, of a switch bridging the terminals of said coil and comprising means movable automatically by movement of the instrument from operating position to transporting position for closing the switch and damping the movement of said coil during transportation of the instrument.

5. The combination with a portable electric instrument comprising a coil movable in a magnetic field for actuating the instrument, said instrument being adapted to occupy one position during operation and a different position during transportation, of a switch bridging the terminals of said coil comprising a container and spaced contacts and a conducting fluid in the container arranged to automatically close said switch upon movement of the instrument from operating position to transporting position, for damping the movement of the coil in said latter position.

6. The combination with a portable electric instrument comprising a coil movable in a magnetic field for actuating the instrument, said instrument being adapted to occupy one position during operation and a different position during transportation, of a container on the instrument arranged to bring one of its ends lowermost in one of said positions of the instrument and the other end lowermost in said other instrument position, spaced contacts connected respectively with the terminals of the coil and located in the end of the container brought lowermost when the instrument is in transporting position, and a conducting fluid partially filling the container for connecting said contacts in the transporting position of the instrument for damping the movement of said coil.

HENRY B. BROWN.